United States Patent
Zhang et al.

(10) Patent No.: US 9,449,210 B2
(45) Date of Patent: *Sep. 20, 2016

(54) METHOD AND SYSTEM FOR DETECTING A CORRECTION PATTERN IN A QR CODE

(71) Applicants: PEKING UNIVERSITY FOUNDER GROUP CO., LTD., Beijing (CN); FOUNDER MOBILE MEDIA TECHNOLOGY (BEIJING) CO., LTD., Beijing (CN)

(72) Inventors: Ling Zhang, Beijing (CN); Chao Guan, Beijing (CN); Zhenhua Liu, Beijing (CN); Gezhang Liu, Beijing (CN); Wanyi Che, Beijing (CN)

(73) Assignees: PEKING UNIVERSITY FOUNDER GROUP CO., LTD., Beijing (CN); FOUNDER MOBILE MEDIA TECHNOLOGY (BEIJING) CO., LTD., Beijing (CN)

( * ) Notice: Subject to any disclaimer, the term of this patent is extended or adjusted under 35 U.S.C. 154(b) by 114 days.

This patent is subject to a terminal disclaimer.

(21) Appl. No.: 14/102,916

(22) Filed: Dec. 11, 2013

(65) Prior Publication Data
US 2015/0090796 A1 Apr. 2, 2015

(30) Foreign Application Priority Data
Sep. 29, 2013 (CN) .......................... 2013 1 0459941

(51) Int. Cl.
G06K 7/14 (2006.01)
G06K 19/06 (2006.01)

(52) U.S. Cl.
CPC ........... G06K 7/1417 (2013.01); G06K 7/1443 (2013.01); G06K 19/06037 (2013.01)

(58) Field of Classification Search
USPC ...................................... 235/462.09–462.11
See application file for complete search history.

(56) References Cited

U.S. PATENT DOCUMENTS

| | | | | |
|---|---|---|---|---|
| 2011/0290878 A1* | 12/2011 | Sun et al. | ...................... | 235/437 |
| 2011/0290879 A1* | 12/2011 | Guo et al. | ...................... | 235/437 |
| 2011/0290880 A1* | 12/2011 | Cai et al. | ...................... | 235/437 |
| 2015/0090794 A1* | 4/2015 | Zhang et al. | ............ | 235/462.09 |

* cited by examiner

*Primary Examiner* — Christle I Marshall
(74) *Attorney, Agent, or Firm* — Brinks Gilson & Lione

(57) ABSTRACT

Method and system for detecting a correction pattern in a QR code are disclosed. In the detection of a correction pattern, coordinates of the correction pattern is at first roughly estimated according to the detected coordinates of the detection patterns and different QR code versions, then a square region is specified around the coordinates of the correction pattern, in which a search is performed repeatedly. Finally, in conjunction with the characteristic of the correction pattern itself, i.e., having a line segment meeting a predetermined ratio, the correction pattern may be accurately located in the predetermined area, without the need of searching patterns meeting a 1:1:1 ratio line by line in the entire QR code image.

29 Claims, 8 Drawing Sheets

METHOD AND SYSTEM FOR DETECTING A CORRECTION PATTERN IN A QR CODE

CROSS-REFERENCE TO RELATED APPLICATIONS

This application claims priority to Chinese Patent Application No. 201310459941.7, filed on Sep. 29, 2013 and entitled "METHOD AND SYSTEM FOR DETECTING A CORRECTION PATTERN IN A QR CODE", which is incorporated herein by reference in its entirety.

FIELD OF THE INVENTION

The present invention relates to the field of image location detecting techniques, and more particular, to a method and system for detecting a correction pattern in a QR code.

DESCRIPTION OF THE RELATED ART

A two dimensional (2D) code is composed of specific and alternative black and white geometric patterns distributed in two dimensions according to some rules, which may present information in two dimensions and thus has a higher information capacity and a higher utilization rate of space, with some checking function as well. 2D codes comprise stacked 2D codes and matrix 2D codes, and QR code is one of matrix 2D codes.

A square module is the smallest information unit in a QR code, and QR codes of different versions include different numbers of modules. A QR code of version 1 includes 21×21 modules, and when its version number increases by 1, four modules are added in both the horizontal and vertical directions in the QR code. In the process of recognizing a QR code image, the image must be corrected, generally, depending on detection patterns and correction patterns in the QR code image. QR codes of different versions have different numbers of correction patterns. In QR code of version 1, no correction pattern is provided; for a QR code of version 2, one correction pattern is provided at about the lower right corner of the QR code. A QR code of version 21 has 22 correction patterns provided therein. A deviation between an inferred central point of correction pattern and an actual central point of correction pattern is estimated based on the shape of the QR code to amend centre distance between various modules, so that even a QR code attached to a bended object may be recognized rapidly.

Currently, detection patterns and correction patterns are detected separately without association. Without considering situations such as serious deformations, a QR code image presents in a square shape, as shown in FIG. 2. The detection patterns and correction patterns are all composed of alternative black and white modules in square shapes. Wherein, detection patterns locate on the upper left, upper right, and lower left positions of a QR code image, and correction patterns locate within a QR code image, with different numbers and at different locations for different versions. A correction pattern is composed of 5×5 black modules, 3×3 black modules and a black module at the centre, making the correction pattern have line sections with a black:white:black ratio of 1:1:1 in various directions. Such a ratio may rarely be present in other patterns in the entire QR code image.

In prior art, generally, patterns having line sections meeting a black:white:black ratio of 1:1:1 are searched in the entire QR code image, including line by line searching in the horizontal direction, line by line searching in the vertical direction, and detecting in diagonal directions, to determine the location of the correction patterns. Detecting a correction pattern with this method has a higher degree of accuracy for a QR code image with smaller deformations, however, with a slower detection speed due to the line by line detection, and thus with a lower detection efficiency.

SUMMARY OF THE INVENTION

Thus, a method for detecting a correction pattern in a QR code is provided in this invention to solve the technical problem in the prior art of unable to detect a correction pattern in a QR code rapidly and accurately.

In order to solve the above problems, this invention is implemented in the following technical solutions.

A method for detecting a correction pattern in a QR code, characterized in comprising the following steps: obtaining reference coordinates based on the relative location relationship between a central point of the correction pattern and central points of detection patterns;

locating the correction pattern precisely in a predetermined area with respect to the reference coordinates to obtain coordinates of the central point of the correction pattern.

Further, the step of obtaining reference coordinates based on the relative location relationship between the central point of the correction pattern and central points of detection patterns comprises:

obtaining coordinates $(X_A, Y_A)$ of the central point of a first detection pattern;

obtaining a horizontal reference coordinate according to the horizontal distance between the central point of the correction pattern and the central point of the first detection pattern; obtaining a vertical reference coordinate according to the vertical distance between the central point of the correction pattern and the central point of the first detection pattern.

Further, the horizontal distance and the vertical distance are determined according to the following equations:

the horizontal distance is $\epsilon_h = \epsilon(X_R - X_A)$ the vertical distance is $\epsilon_z = \epsilon(Y_R - Y_A)$ wherein, $X_R = X_B - X_A + X_C$, $Y_R = Y_B - Y_A + Y_C$, $(X_B, Y_B)$ is the coordinates of the central point of a second detection pattern; $(X_C, Y_C)$ is the coordinates of the central point of a third detection pattern; $\epsilon$ is an offset factor of the correction pattern.

Further, the offset factor of the correction pattern is determined according to the following equation:

$\epsilon = (N-3)/N$ wherein, N is the number of modules contained in the QR code in the horizontal or vertical direction.

Further, in the step of locating the correction pattern in a predetermined area with respect to the reference coordinates to obtain coordinates of the central point of the correction pattern, the predetermined area is a square region including the reference coordinates, and the square region includes at least 64 modules.

Further, the square region includes 256 modules.

Further, the square region includes 1024 modules.

Further, the step of locating the correction pattern in a predetermined area with respect to the reference coordinates to obtain coordinates of the central point of the correction pattern comprises:

detecting, in the predetermined area along the first direction, a first line segment having a length ratio of white:black:white meeting a predetermined ratio, and determining the central point of the black portion of the first line segment;

taking the central point of the black portion of the first line segment as a reference location to obtain a second detection line perpendicular to the first line segment, detecting along the second detection line a second line segment having a length ratio of white:black:white meeting the predetermined ratio, and taking the central point of the black portion of the second line segment as the central point of the correction pattern.

Further, the step of locating the correction pattern in a predetermined area with respect to the reference coordinates to obtain coordinates of the central point of the correction pattern further comprises:

taking the central point of the black section of the second line segment as a reference location, obtaining a third detection line perpendicular to the second line segment; detecting on the third detection line a third line segment having a length ratio of white:black:white meeting the predetermined ratio, wherein if the third line segment is detected, the central point of the black section of the second line segment is the central point of the correction pattern; otherwise, the process returns to the step of detecting in the predetermined area along the first direction.

Further, the step of locating the correction pattern in a predetermined area with respect to the reference coordinates to obtain coordinates of the central point of the correction pattern further comprises:

taking the central point of the black section of the second line segment as a reference location, obtaining a fourth detection line at +45 degree or −45 degree with respect to the first direction; detecting on the fourth detection line a fourth line segment having a length ratio of white:black:white meeting a predetermined ratio; wherein if the fourth line segment is detected, the central point of the black section of the second line segment is the central point of the correction pattern; otherwise, the process returns to the step of detecting in the predetermined area along the first direction.

Further, the step of locating the correction pattern in a predetermined area with respect to the reference coordinates to obtain coordinates of the central point of the correction pattern further comprises:

determining edge lines of the correction pattern in the first direction according to two end points of the first line segment;

determining edge lines of the correction pattern in the second direction according to two end points of the second line segment;

obtaining a quadrangular border of the correction pattern according to the edge lines in the first direction and the edge lines in the second direction, wherein the geometrical centre of the quadrangular border is an approximate central point of the correction pattern;

obtaining the midpoint of a line connecting the central point of the black section of the second line segment and the approximate central point as the central point of the correction pattern.

Further, the predetermined ratio is such configured that:
the sum of lengths of the white sections and the black section ranges from 0.7 L to 1.3 L, wherein L is the length of three modules, and the lengths of the white section and the black section are both less than or equal to the length of 2 modules.

Further, in the step of locating the correction pattern in a predetermined area with respect to the reference coordinates to obtain coordinates of the central point of the correction pattern:

if no horizontal or vertical line segment having a length ratio of white:black:white meeting the predetermined ratio is detected in the first direction after the detection in the predetermined area, the following step is performed:

detecting, along the first direction in the predetermined area, a line segment having a white section in a predetermined length, and determining a first central point of the line segment;

taking the first central point as a reference location, obtaining a detection line perpendicular to the first direction, detecting on the detection line a line segment having a white section in the predetermined length, and taking the midpoint of the line segment as the central point of the correction pattern.

Further, the predetermined length ranges from 0.7 L to 1.3 L.

A system for detecting a correction pattern in a QR code, characterized in comprising:

a rough locating module, for obtaining reference coordinates based on the relative location relationship between a central point of the correction pattern and central points of detection patterns;

a precise locating module, for locating the correction pattern precisely in a predetermined area with respect to the reference coordinates to obtain coordinates of the central point of the correction pattern.

Further, the rough locating module comprises:
a unit for obtaining coordinates of central points of detection patterns, which is configured to obtain coordinates $(X_A, Y_A)$ of the central point of a first detection pattern;

a unit for obtaining reference coordinates, which is configured to obtain a horizontal reference coordinate according to the horizontal distance between the central point of the correction pattern and the central point of the first detection pattern; obtaining a vertical reference coordinate according to the vertical distance between the central point of the correction pattern and the central point of the first detection pattern.

Further, the unit for obtaining reference coordinates determines the horizontal distance and the vertical distance according to the following equations:

horizontal distance $\epsilon_h = \epsilon(X_R - X_A)$ vertical distance $\epsilon_z = \epsilon(Y_R - Y_A)$ wherein, $X_R = X_B - X_A + X_C$, $Y_R = Y_B - Y_A + Y_C$, $(X_B, Y_B)$ is the coordinates of the central point of a second detection pattern; $(X_C, Y_C)$ is the coordinates of the central point of a third detection pattern; e is an offset factor of the correction pattern.

Further, the offset factor of the correction pattern is $\epsilon = (N-3)/N$, wherein N is the number of modules contained in the QR code in the horizontal or vertical direction.

Further, in the precise locating module, the predetermined area is a square region including the reference coordinates, and the square region includes at least 64 modules.

Further, in the precise locating module, the square region includes 256 modules.

Further, in the precise locating module, the square region includes 1024 modules.

Further, the precise locating module further comprises:
a first direction detection unit, for detecting, in the predetermined area along the first direction, a first line segment having a length ratio of white:black:white meeting a predetermined ratio, and determining the central point of the black portion of the first line segment;

a second direction detection unit, for taking the central point of the black portion of the first line segment as a reference location to obtain a second detection line perpendicular to the first line segment, detecting along the second detection line a second line segment having a length ratio of white:black:white meeting the predetermined ratio, and taking the central point of the black portion of the second line segment as the central point of the correction pattern.

Further, the precise locating module further comprises:

a comparison and determination unit, for taking the central point of the black section of the second line segment as a reference location, obtaining a third detection line perpendicular to the second line segment; detecting on the third detection line a third line segment having a length ratio of white:black:white meeting the predetermined ratio, wherein if the third line segment is detected, the central point of the black section of the second line segment is the central point of the correction pattern; otherwise, the process returns to the first direction detection unit.

Further, the precise locating module further comprises:

a diagonal detection unit, for taking the central point of the black section of the second line segment as a reference location, obtaining a fourth detection line at +45 degree or −45 degree with respect to the first direction; detecting on the fourth detection line a fourth line segment having a length ratio of white:black:white meeting a predetermined ratio; wherein if the fourth line segment is detected, the central point of the black section of the second line segment is the central point of the correction pattern; otherwise, the process returns to the first direction detection unit.

Further, the first direction detection unit is further configured to determine edge lines of the correction pattern in the first direction according to two end points of the first line segment;

the second direction detection unit is further configured to determine edge lines of the correction pattern in the second direction according to two end points of the second line segment;

an unit for obtaining an approximate central point, which is configured to obtain a quadrangular border of the correction pattern according to the edge lines in the first direction and the edge lines in the second direction, wherein the geometrical centre of the quadrangular border is an approximate central point of the correction pattern;

a unit for obtaining central point of correction pattern, which is configured to obtain the midpoint of a line connecting the central point of the black section of the second line segment and the approximate central point as the central point of the correction pattern.

Further, the predetermined ratio is such configured that:

the sum of lengths of the white sections and the black section ranges from 0.7 L to 1.3 L, wherein L is the length of three modules, and the lengths of the white section and the black section are both less than or equal to the length of 2 modules.

Further, the precise locating module further comprises:

a first direction fuzzy detection unit, for detecting, along the first direction in the predetermined area, a line segment having a white section in a predetermined length, and determining a first central point of the line segment;

a second direction fuzzy detection unit, for taking the first central point as a reference location, obtaining a detection line perpendicular to the first direction, detecting on the detection line a line segment having a white section in the predetermined length, and taking the midpoint of the line segment as the central point of the correction pattern.

Further, the predetermined length ranges from 0.7 L to 1.3 L.

The technical solutions of this invention have the following advantages over the prior art:

(1) In the method for detecting correction patterns in a QR code of this invention and the method for detecting correction patterns in a QR code of this embodiment, precise locating is performed in a predetermined area, with an amount of computation certainly less than that of scanning in the entire QR code image in a line by line and column by column manner. Thus, the time of detecting the correction patterns may be shortened to a certain extent, and detection efficiency may be improved as well.

(2) According to the method and system for detecting a correction pattern in a QR code of this invention, when the correction pattern is detected, in the rough locating step, reference coordinates are obtained based on the relative location relationship between a central point of the correction pattern and central points of detection patterns. Because detection patterns must be detected first in the process of recognizing a QR code image, locations of the detection patterns are obtained before the detection of the correction pattern. No matter in which version, the location relationship between the correction pattern on the lower right corner and the three detection patterns is fixed. In conjunction with the location relationship between the detection patterns and the correction pattern, coordinates of the correction pattern may be obtained to realize fast detection of the correction pattern, and resource may be integrated and optimized effectively.

(3) In the method and system for correcting a correction pattern in a QR code of this invention, a standard QR code showing a square structure is adopted, and the distance between the central points of the correction pattern and the second detection pattern in the vertical direction differs from the distance between the central points of the third detection pattern and the first detection pattern in the vertical direction by 3 modules. The distance between the central points of the correction pattern and the third detection pattern in the horizontal direction differs from the distance between the central points of the second detection pattern and the first detection pattern in the horizontal direction by 3 modules. Coordinates of the central point of the correction pattern are obtained based on the above location relationship. The purpose of providing correction patterns is to provide corresponding data in a correction step of the decoding process, to enable the recovery of a distorted QR code image, and thus to get ready for the later decoding process. However, not all correction patterns are needed in the correction of a distorted QR code image. If no edge detection will be performed, it is not necessary to detect all correction patterns, which may otherwise consume a lot of memory and lead to a large amount of computation, causing a lower overall computing speed. Thus, selecting coordinates of the correction pattern on the lower right corner may reduce the amount of computation.

(4) In the method and system for correcting a correction pattern in a QR code of this invention, in the step of precise locating, the predetermined area is a square region including the reference coordinates. A too large square region may cause a broader detection range, leading to a large amount of computation and a lower computing speed; a too small square region may cause unsuccessful detection of the correction pattern. Because a correction pattern is a square containing 5×5 modules, preferably, the square region includes at least 64 modules herein. If a correction pattern cannot be detected in a detection area of 64 modules, the square region is expanded to an area including 256 modules or even an area including 1024 modules. A selection can be made for the square region to detect according to the above steps from a smaller area to a larger area, or a square region can be specified separately without expanded detection.

(5) In the method and system for correcting a correction pattern in a QR code of this invention, errors introduced in the shooting and binarization process of the QR code image, if any, may be handled appropriately. Due to errors introduced, the central black module of the correction pattern may become very large or merely a spot, and may be out of the central area. In this case, the central point of the black module and the central point of the correction pattern may be obtained respectively, and a midpoint between the two central points may be selected as the central point; or if there is not a central black module at all in the correction pattern, a white module in a square region may be detected. If line segments therein have a length meeting a predetermined length, a correction pattern may be determined also and its central point may be taken as the central point of the correction pattern. Thus, the detection of correction pattern is not limited to effective detection for correction patterns with smaller distortions, and may produce a good detection effect on distorted QR code images as well.

BRIEF DESCRIPTION OF THE DRAWINGS

For a clear understanding of the content of this invention, this invention will be further described according to particular embodiments in reference to drawings.

01—first line segment, 02—second line segment, 03—third line segment, 04—fourth line segment, 3—first detection pattern, 4—second detection pattern, 5—third detection pattern.

DESCRIPTION OF THE EMBODIMENTS

Embodiment 1

Figure 1:
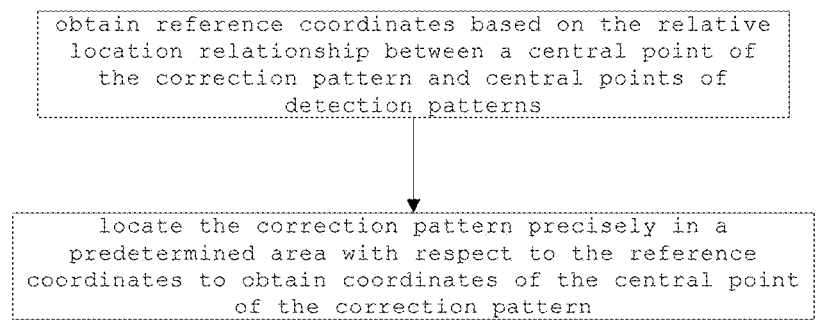
FIG. 1 is a flowchart of a method for detecting a correction pattern in a QR code according to an embodiment of this invention.

A method for detecting a correction pattern in a QR code is provided in this embodiment, which as shown in FIG. 1 comprises the following steps:

obtaining reference coordinates based on the relative location relationship between a central point of the correction pattern and central points of detection patterns;

locating the correction pattern precisely in a predetermined area with respect to the reference coordinates to obtain coordinates of the central point of the correction pattern.

Note that, for different QR code versions, the number of correction patterns and their locations may be different also. In this embodiment, the correction pattern to be detected and located is a correction pattern on the lower right corner of a QR code, for example, correction pattern 1 shown in FIG. 2. No matter in which version, the correction pattern on the lower right corner has constant distances to edges of the QR code. Thus, according to the location characteristic of the correction pattern on the lower right corner, reference coordinates may be obtained, which may be coordinates of a corner point on the lower right corner, or coordinates of a point separate from the corner point on the lower right corner by several modules in both the horizontal and vertical directions. Because the central point of the correction pattern is merely referenced in the step of obtaining reference coordinates based on the relative location relationship between a central point of the correction pattern and central points of detection patterns, it does not have a high precision requirement.

In the step of locating the correction pattern precisely in a predetermined area with respect to the reference coordinates to obtain coordinates of the central point of the correction pattern, the predetermined area may have a size several or no more than twenty times the size of the correction pattern, to ensure that the correction pattern is enclosed therein.

In the method for detecting a correction pattern in a QR code of this embodiment, precise locating is performed in a predetermined area, with an amount of computation certainly less than that of scanning in the entire QR code image in a line by line and column by column manner. Thus, the time for detecting a correction pattern may be shortened to a certain extent, and detection efficiency may be improved as well.

Figure 2:
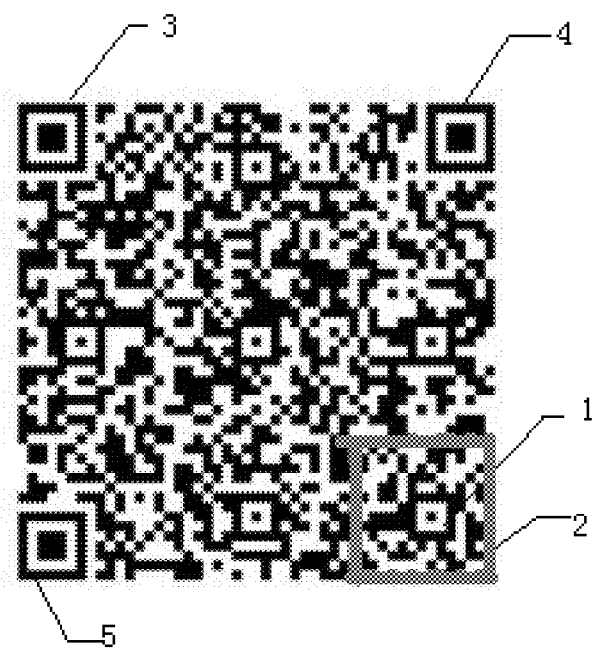
FIG. 2 is a schematic diagram of the selection of a square region according to an embodiment of this invention.

In this embodiment, in the step of obtaining reference coordinates based on the relative location relationship between a central point of the correction pattern and central points of detection patterns, because detection patterns must be detected first in the process of recognizing a QR code image, locations of the detection patterns have been obtained before the detection of the correction pattern. No matter in which version, the location relationship between the correction pattern on the lower right corner and the three detection patterns is fixed. In this embodiment, for a QR code placed positively, the detection pattern on the upper left corner is first detection pattern 3, the detection pattern on the upper right corner is second detection pattern 4, and the detection pattern on the lower left corner is third detection pattern 5. Referring to FIG. 2, the location relationship is: the distance between the central points of the correction pattern and the second detection pattern 4 in the vertical direction differs from the distance between the central points of the third detection pattern 5 and the first detection pattern 3 in the vertical direction by 3 modules, the distance between the central points of the correction pattern and the third detection pattern 5 in the horizontal direction differs from the distance between the central points of the second detection pattern 4 and the first detection pattern 3 in the horizontal direction by 3 modules. Thus, when the locations of the three detection patterns are known, it is more convenient to roughly determine the location coordinates of the central point of the correction pattern according to the above location relationship.

In this embodiment, in conjunction with the location relationship between the detection patterns and the correction pattern, coordinates of the correction pattern may be obtained to realize fast correction pattern detection, and resource may be integrated and optimized effectively.

Figure 3:
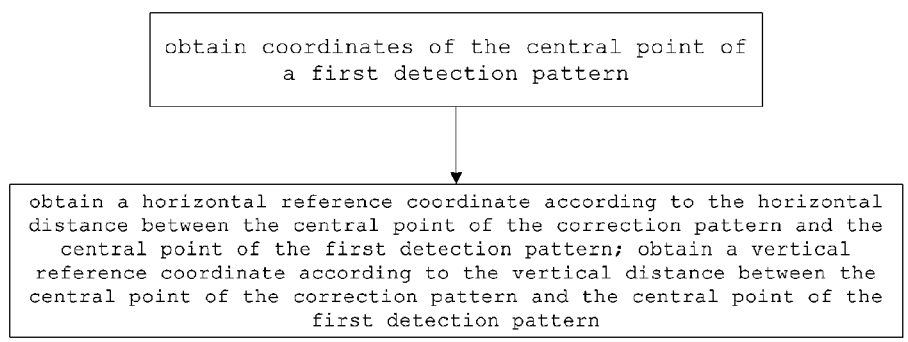
FIG. 3 is a flowchart of a method for detecting a correction pattern in a QR code according to an embodiment of this invention.

Below, how to obtain reference coordinates based on detection patterns in the step of rough locating in this embodiment will be described in detail with reference to FIG. 2 and FIG. 3. As shown in FIG. 3, the step of obtaining reference coordinates based on the relative location relationship between the central point of the correction pattern and central points of detection patterns comprises:

obtaining coordinates $(X_A, Y_A)$ of the central point of a first detection pattern;

obtaining a horizontal reference coordinate according to the horizontal distance between the central point of the correction pattern and the central point of the first detection pattern; obtaining a vertical reference coordinate according to the vertical distance between the central point of the correction pattern and the central point of the first detection pattern.

Referring to FIG. 2, first detection pattern 3 is a detection pattern on the upper left corner of the entire QR code image. Second detection pattern 4 and third detection pattern 5 are detection patterns on the upper right corner and the lower left corner of the entire QR code image respectively, or may be detection patterns on the lower left corner and the upper right corner of the entire QR code image respectively. Because a standard QR code is presented in a square structure, and the distance between the central points of the correction pattern and the second detection pattern 4 in the vertical direction differs from the distance between the central points of the third detection pattern 5 and the first detection pattern 3 in the vertical direction by 3 modules; the distance between the central points of the correction pattern and the third detection pattern 5 in the horizontal direction differs from the distance between the central points of the second detection pattern 4 and the first detection pattern 3 in the horizontal direction by 3 modules, with the above relationship, in the step of obtaining reference coordinates of this embodiment, the horizontal distance and the vertical distance are determined according to the following equations:

the horizontal distance is $\epsilon_h = \epsilon(X_R - X_A)$ the vertical distance is $\epsilon_z = \epsilon(Y_R - Y_A)$ wherein, $X_R = X_B - X_A + X_C$, $Y_R = Y_B - Y_A + Y_C$, $(X_B, Y_B)$ is the coordinates of the central point of a second detection pattern; $(X_C, Y_C)$ is the coordinates of the central point of a third detection pattern; $\epsilon$ is an offset factor of the correction pattern. In this embodiment, the offset factor of the correction pattern is determined according to the following equation:

$\epsilon = (N-3)/N$ wherein, N is the number of modules contained in the QR code image in the horizontal or vertical direction. As described above, different QR code versions may have different numbers of correction patterns and their locations. This embodiment is not intended to find out all correction patterns, but the correction pattern on the lower right corner of the entire QR code image. The purpose of providing correction patterns is to provide corresponding data in a correction step of the decoding process, to enable the recovery of a distorted QR code image, and thus to get ready for the later decoding process. However, not all correction patterns are needed in the correction of a distorted QR code image. If no edge detection will be performed, it is not necessary to detect all correction patterns, which may otherwise consume a lot of memory and lead to a large amount of computation, causing a lower overall computing speed. In the case of a QR code image without any distortion, the coordinates of the correction pattern is the reference coordinates. However, it is not likely in practice to ensure a QR code image without any distortion, making a following precise locating process extraordinarily important.

Those skilled in the art may appreciate that this embodiment is not limited to a correction pattern on the lower right corner of the entire QR code image. As well known, detection patterns have corresponding relationships with correction patterns in standard QR code images of other different versions, particularly, different relationships in different versions. With corresponding changes in computation parameters, correction patterns at different locations may be rapidly detected with the method of this embodiment. Corresponding relationships between correction patterns and detection patterns of various versions will not be described in this embodiment, which are however considered as prior art, and thus are well known by those skilled in the art. All of other computations and modifications with obvious changes in parameters fall within the protection scope of this embodiment.

Embodiment 2

Modifications are made in this embodiment based on embodiment 1. In the step of locating the correction pattern precisely in a predetermined area with respect to the reference coordinates to obtain coordinates of the central point of the correction pattern, the predetermined area is configured as a square region including the reference coordinates. It can be seen from FIG. 2, rough reference coordinates are obtained after the rough locating of the correction pattern, and then the correction pattern is located precisely in a predetermined area with respect to the reference coordinates. It is obvious that the correction pattern on the lower right corner of the QR code image falls into the square region, i.e., within the gray border. A too large square region may cause a broader detection range, leading to a large amount of computation and a lower detection speed; a too small square region may cause unsuccessful detection of the correction pattern. Because a correction pattern is a square containing 5×5 modules, preferably, the square region includes at least 64 modules herein. If a correction pattern cannot be detected in a detection area of 64 modules, the square region is expanded to an area including 256 modules or even an area including 1024 modules. A selection can be made for the square region to detect according to the above steps from a smaller area to a larger area, or a square region can be specified separately without expanded detection.

A square module is the smallest information unit in a QR code, and QR codes of different versions include different numbers of modules. A QR code of version 1 includes 21×21 modules, and when its version number increases by 1, four modules are added in each of the horizontal and vertical directions in the QR code. The current highest version of QR code is Version 40, and its QR code comprises 177×177 modules. A correction pattern is composed of 5×5 black modules, 3×3 white modules, and 1 black module at the centre. In the selection of the square region, 64 modules, i.e., 8×8 modules are selected at first, which may completely enclose the entire correction pattern. Only if the correction pattern to be detected cannot be obtained in the square region with 64 modules due to an overall distortion or a large amount of offset of the QR code image, it is necessary to detect the correction pattern in an expanded area. The detection region may be expanded to 16×16 modules, i.e., a square region including 256 modules. If the correction pattern still cannot be found, the detection region may be further expanded to a square region including 1024 modules, i.e., 32×32 modules. At that point, in view of that the coordinates referred to in the rough locating is on the lower right portion of the QR code image, such a square region may go beyond the QR code image. If the correction pattern still cannot be found in such an expanded detection region, in theory, the detection region may be further expanded for detection. However, in most cases, the QR code image under detection may not be a real QR code image, i.e., there may be a mistake in the initial detection. Or the QR code image has got such a severe distortion that, even for a real QR code image, it is very difficult to decode the QR code image as limited by current techniques. To save computation steps, it is determined that when the correction pattern cannot be detected successfully, an error may be reported, and the detection step may exit. However, as appreciated by those skilled in the art, in this embodiment, an option may be still reserved to further expand the square region.

Figure 4:
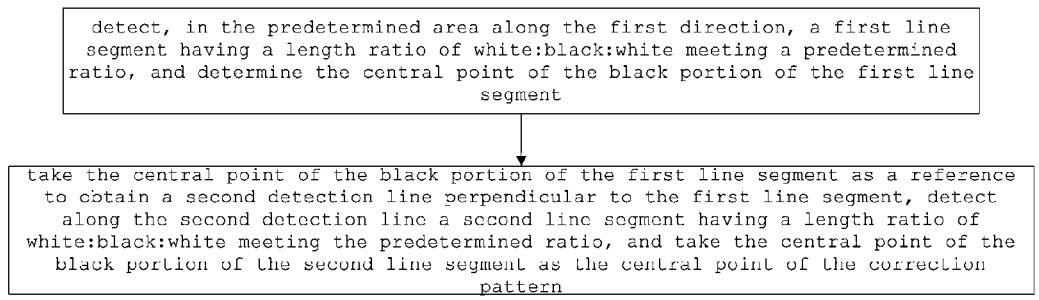
FIG. 4 is a flowchart of a method for detecting a correction pattern in a QR code according to an embodiment of this invention.

In this embodiment, as shown in FIG. 4, the step of locating the correction pattern in a predetermined area with respect to the reference coordinates to obtain coordinates of the central point of the correction pattern comprises:

detecting, in the predetermined area along the first direction, a first line segment having a length ratio of white:black:white meeting a predetermined ratio, and determining the central point of the black portion of the first line segment;

taking the central point of the black portion of the first line segment as a reference location to obtain a second detection line perpendicular to the first line segment, detecting along the second detection line a second line segment having a length ratio of white:black:white meeting the predetermined ratio, and taking the central point of the black portion of the second line segment as the central point of the correction pattern.

Wherein, the first direction may be the horizontal or vertical direction. When the first direction is the horizontal direction, the second direction is the vertical direction; when the first direction is the vertical direction, the second direction is the horizontal direction.

Figure 5:
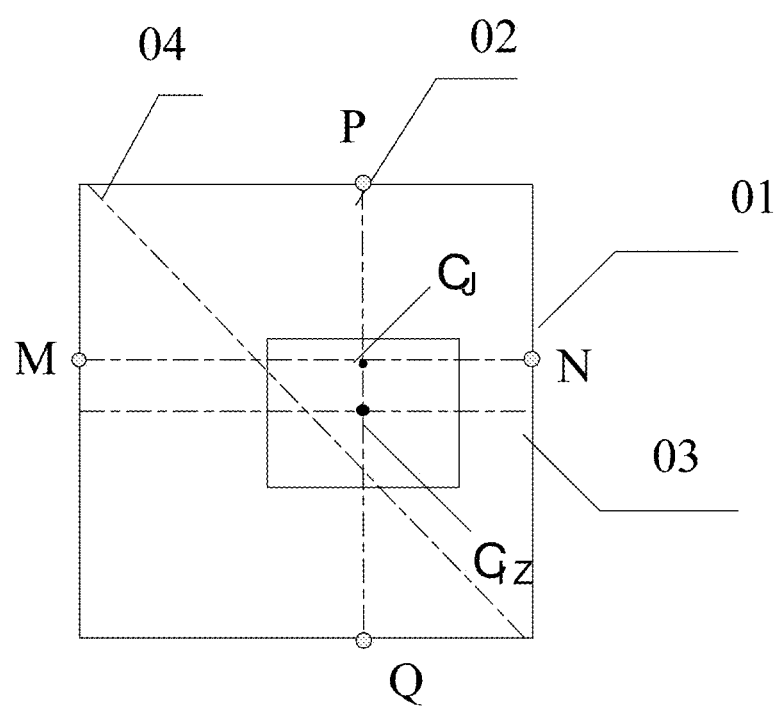
FIG. 5 is a schematic diagram of a correction pattern in a QR code according to an embodiment of this invention.

As shown in FIG. 5, the correction pattern is composed of an outermost square with 5×5 black modules, a middle square with 3×3 white modules, and an innermost black square with 1 module. If the horizontal detection/vertical detection is performed thereon, the correction pattern should meet a white:black:white ratio of 1:1:1 inside, and has a length of 3 modules. The QR code does not have such a line segment that meets this condition at other positions. However, it should be seen from the figure, due to interference, the inner black square of the correction pattern shown in FIG. 5 is not at the centre of the white square. In practice, most QR codes are interfered, i.e., line segments in most of correction patterns do not meet the above ratio. Thereby, a predetermined ratio is provided with an allowable range of error based on the 1:1:1 ratio. In this embodiment, the predetermined ratio is such configured that the sum of lengths of the white sections and the black section is from 0.7 L to 1.3 L, wherein L is the length of three modules, and the lengths of the white section and the black section are both less than or equal to the length of 2 modules. That is, the length of each white section and the length of each black section in the white:black:white pattern should not be larger than the length of 2 modules, and the total length of the white:black:white pattern is between 2.1 modules to 3.9 modules. If there is a white section, a black section or a white:black:white line segment exceeding the above limits, it is considered that the second predetermined ratio is not satisfied.

In the detection, it is possible to detect first in the horizontal direction or in the vertical direction. Referring to FIG. 5, in this embodiment, the detection is performed at first in the horizontal direction, as an example. It can be seen from the figure, horizontal detection is performed in a predetermined area with respect to the reference central point from top to bottom. If a first line segment 01 meeting the predetermined ratio is detected, the midpoint $C_j$ of the black section of the line segment is selected, which is perhaps not the central point of the inner black square, but is necessarily the central point of the square in the horizontal direction. Thus, vertical detection is performed on this basis, and if there is a vertical line segment 02 having a ratio of white:black:white meeting the predetermined ratio, the midpoint $C_{IZ}$ of vertical line segment 02 is necessarily the central point of the black square, i.e., the central point of the correction pattern.

Figure 6:
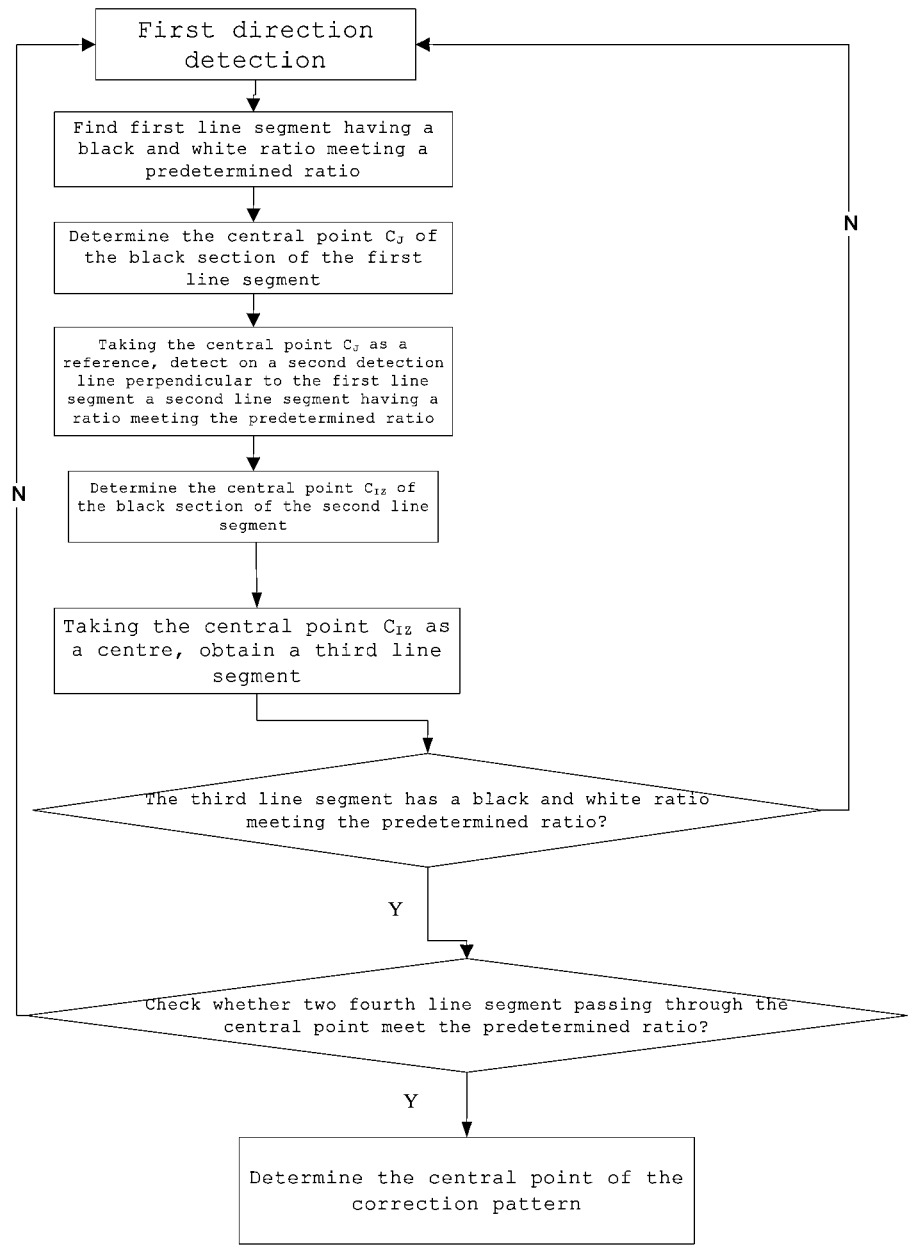
FIG. 6 is a flowchart of a method for detecting a correction pattern in a QR code according to an embodiment of this invention.

In this embodiment, preferably, as shown in FIG. 6, locating the correction pattern precisely in a predetermined area with respect to the reference coordinates to obtain coordinates of the central point of the correction pattern further comprises the following step:

taking the central point of the black section of the second line segment as a reference location, obtaining a third detection line perpendicular to the second line segment; detecting on the third detection line a third line segment having a length ratio of white:black:white meeting the predetermined ratio, wherein if the third line segment is detected, the central point of the black section of the second line segment is the central point of the correction pattern; otherwise, the process returns to the step of detecting in the predetermined area along the first direction.

taking the central point of the black section of the second line segment as a reference location, obtaining a fourth detection line at +45 degree or −45 degree with respect to the first direction; detecting on the fourth detection line a fourth line segment having a length ratio of white:black:white meeting a predetermined ratio; wherein if the fourth line segment is detected, the central point of the black section of the second line segment is the central point of the correction pattern; otherwise, the process returns to the step of detecting in the predetermined area along the first direction.

Still as shown in FIG. 5, the midpoint of the black section of second line segment 02 is obtained through the above detection. At that time, it is determined that the midpoint $C_{IZ}$ of the black section of second line segment 02 is the centre of the correction pattern in theory, which is however merely verified in the second direction, without confirming whether the condition of a length ratio of white:black:white meeting the predetermined ratio is satisfied in the first direction, so detection errors may occur. In order to prevent such situations, as shown in FIG. 6, a determination is further made on third detection line 03 perpendicular to second line segment 02 where the midpoint $C_{IZ}$ of second line segment 02 lies, to determine whether there is a line segment having a length ratio of white:black:white meeting the predetermined ratio on third detection line 03. Meanwhile, detection on diagonal directions is further provided. That is, taking the midpoint of the black section of second line segment 02 as a reference location, a fourth detection line at +45 degree or −45 degree with respect to the first direction is obtained, and a fourth line segment having a length ratio of white:black:white meeting the predetermined ratio is detected on the fourth detection line. If the fourth line segment is detected, the midpoint of the black section of the second line segment is the centre of the correction pattern; otherwise, the process returns to the step of detecting in the predetermined area along the first direction. Through detecting on fourth detection line 04 passing through midpoint $C_{IZ}$ at +45 degree or −45 degree with respect to the first direction, if the midpoint of second line segment 02 is indeed the centre of the correction pattern, the above condition will be satisfied; otherwise, it is not the centre of the correction pattern. This process may further ensure the accuracy of the detection. Thereby, the correction pattern in the QR code image may be detected rapidly, while ensuring detection accuracy to a certain extent and effectively lowering the rate of detection errors.

However, due to errors introduced in the shooting and binarization process of the QR code image, the central black module of the correction pattern may become very large or merely a spot, and may be out of the central area. In this case, the correction pattern cannot be detected successfully with the above method. In order to realize effective correction pattern detection in such a case, this embodiment provides the following method:

determining edge lines of the correction pattern in the first direction according to two end points of the first line segment;

determining edge lines of the correction pattern in the second direction according to two end points of the second line segment;

obtaining a quadrangular border of the correction pattern according to the edge lines in the first direction and the edge lines in the second direction, wherein the geometrical centre of the quadrangular border is an approximate central point of the correction pattern;

obtaining the midpoint of a line connecting the central point of the black section of the second line segment and the approximate central point as the central point of the correction pattern.

Figure 7:
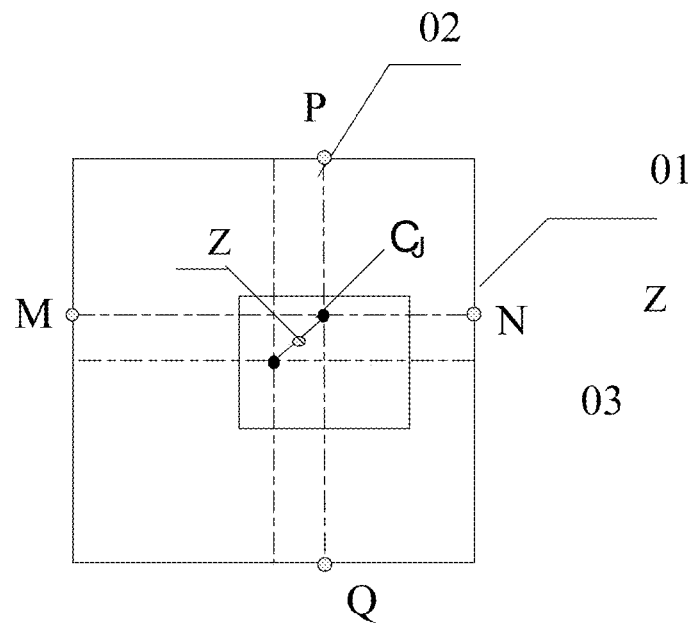
FIG. 7 is a schematic diagram of a correction pattern in a QR code according to an embodiment of this invention.
Figure 8:
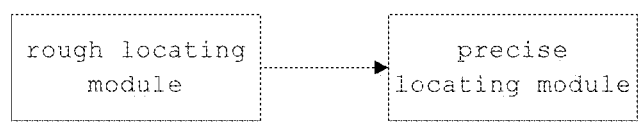
FIG. 8 is a structural diagram of a system for detecting a correction pattern in a QR code according to an embodiment of this invention.

As shown in FIG. 7, according to two end points M, N of the first line segment in the horizontal direction, and two end points P, Q of the second line segment in the vertical direction, positions of four edges of an internal white square within the correction pattern may be determined. The horizontal coordinate of the midpoint between M and N is the horizontal coordinate of an approximate central point, and the vertical coordinate of the midpoint between P and Q is the vertical coordinate of the approximate central point. The central point of the internal black square and an approximate central point of the whole correction pattern are obtained, and the midpoint between the two points is the central point of the correction pattern, with the advantage of enabling appropriate processing of impacts caused by serious distortion of the central black module of the correction pattern to improve detection capability under various complex situations and ensure effective and accurate detection of the correction pattern in this embodiment.

The above setting of the predetermined ratio is derived from many numerical experiments, which may ensure favourable detection accuracy. Those skilled in the art may appreciate that other possible changes in data are all within the protection scope of this embodiment.

Embodiment 3

Modifications are made in this embodiment based on embodiments 1 and 2, mainly for detecting a correction pattern with a severe distortion in the central black module of the correction pattern. Taking a full consideration of various situations, in practice, the central black module of the correction pattern may disappear due to distortion or other reasons, only remaining the white module, as shown in FIG. 7. For this situation, a corresponding detection method is provided in this embodiment.

In the step of locating the correction pattern precisely in a predetermined area with respect to the reference coordinates to obtain coordinates of the central point of the correction pattern:

if no horizontal or vertical line segment having a length ratio of white:black:white meeting the predetermined ratio is detected in the first direction after the detection in the predetermined area, the following step is performed:

detecting, along the first direction in the predetermined area, a line segment having a white section in a predetermined length, and determining a first central point of the line segment;

taking the first central point as a reference location, obtaining a detection line perpendicular to the first direction, detecting on the detection line a line segment having a white section in the predetermined length, and taking the midpoint of the line segment as the central point of the correction pattern.

In the absence of the central black module of the correction pattern, the correction pattern cannot be detected with the method of embodiment 2. Thus, a white module in a square region may be detected. If line segments therein have a length meeting a predetermined length, a correction pattern may be determined also and its central point may be taken as the central point of the correction pattern. Thus, correction pattern detection is not limited to effective detection for correction patterns with small distortions, and may produce a good detection effect on distorted QR code images as well, with improved capability of detecting correction patterns under various complex situations, to meet user's higher and higher requirements for QR code detection.

In order to ensure detection accuracy at the same time, a predetermined line segment length ranging from 0.7 L to 1.3 L is provided in this embodiment, which is derived from many numerical experiments, and may ensure favourable detection accuracy.

Embodiment 4

A system for detecting a correction pattern in a QR code is provided in this embodiment, which as shown in FIG. 1 comprises:

a rough locating module, for obtaining reference coordinates based on the relative location relationship between a central point of the correction pattern and central points of detection patterns;

a precise locating module, for locating the correction pattern precisely in a predetermined area with respect to the reference coordinates to obtain coordinates of the central point of the correction pattern.

In the system for detecting a correction pattern in a QR code of this embodiment, precise locating is performed in a predetermined area, with an amount of computation certainly less than that of scanning in the entire QR code image in a line by line and column by column manner. Thus, the time for detecting a correction pattern may be shortened to a certain extent, and detection efficiency may be improved as well.

Figure 9:
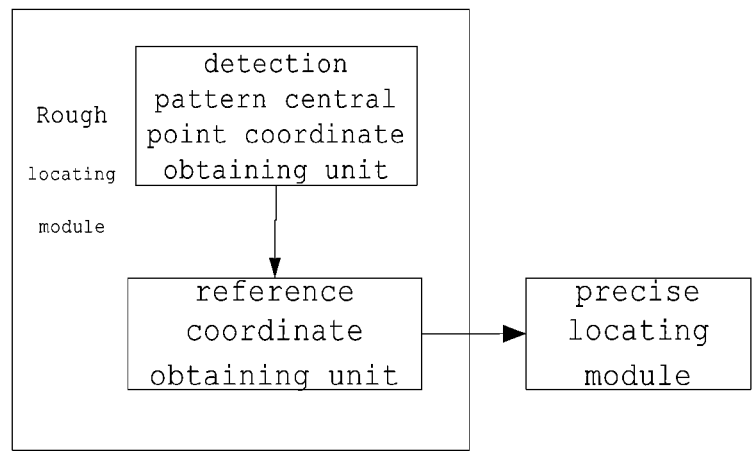
FIG. 9 is a structural diagram of a system for detecting a correction pattern in a QR code according to an embodiment of this invention.

In this embodiment, as shown in FIG. 9, preferably, the rough locating module particularly comprises:

a unit for obtaining coordinates of central points of detection patterns, which is configured to obtain coordinates $(X_A, Y_A)$ of the central point of a first detection pattern;

a unit for obtaining reference coordinates, which is configured to obtain a horizontal reference coordinate according to the horizontal distance between the central point of the correction pattern and the central point of the first detection pattern; obtaining a vertical reference coordinate according to the vertical distance between the central point of the correction pattern and the central point of the first detection pattern.

Herein, the first detection pattern is a detection pattern on the upper left corner of the entire QR code image. The second detection pattern and third detection pattern are detection patterns on the upper right corner and the lower left corner of the entire QR code image respectively, or may be detection patterns on the lower left corner and the upper right corner of the entire QR code image respectively. Because a standard QR code is presented in a square structure, the second and third detection patterns may not have a notable influence on the relative location between the correction pattern and the first detection pattern, and thus will not be strictly limited to keep the selection adaptable. As for the step of sorting detection patterns before detecting the correction pattern, provided that the coordinates of the first detection pattern are correct, a mistake in the sorting of the second and third detection patterns may not impact the detection of the correction pattern, leading to ensured detection accuracy to some extent.

In this embodiment, the unit for obtaining reference coordinates determines the horizontal distance and the vertical distance according to the following equations:

horizontal distance $\epsilon_h = \epsilon(X_R - X_A)$ vertical distance $\epsilon_z = \epsilon(Y_R - Y_A)$ wherein, $X_R = X_B - X_A + X_C$, $Y_R = Y_B - Y_A + Y_C$, $(X_B, Y_B)$ is the coordinates of the central point of a second detection pattern; $(X_C, Y_C)$ is the coordinates of the central point of a third detection pattern; e is an offset factor of the correction pattern.

the offset factor of the correction pattern is $\epsilon = (N-3)/N$, wherein N is the number of modules contained in the QR code in the horizontal or vertical direction.

Different QR code versions may have different numbers of correction patterns and their locations. This embodiment is not intended to find out all correction patterns, but the correction pattern on the lower right corner of the entire QR code image. The purpose of providing correction patterns is to provide corresponding data in a correction step of the decoding process, to enable the recovery of a distorted QR code image, and thus to get ready for the later decoding process. However, not all correction patterns are needed in the correction of a distorted QR code image. If no edge detection will be performed, it is not necessary to detect all correction patterns, which may otherwise consume a lot of memory and lead to a large amount of computation, causing a lower overall computing speed. In the case of a QR code image without any distortion, the coordinates of the correction pattern is the reference coordinates. However, it is not likely in practice to ensure a QR code image without any distortion, making a following precise locating process extraordinarily important.

Embodiment 5

Modifications are made in this embodiment based on embodiment 4. In the precise locating module, the predetermined area is configured as a square region including the reference coordinates. A too large square region may cause a broader detection range, leading to a large amount of computation and a lower computing speed; a too small square region may cause unsuccessful detection of the correction pattern. Preferably, the square region includes at least 64 modules herein. If a correction pattern cannot be detected in a detection area of 64 modules, the square region is expanded to an area including 256 modules or even an area including 1024 modules. A selection can be made for the square region to detect according to the above steps from a smaller area to a larger area, or a square region can be specified separately without expanded detection. The size of the square region may be selected in a flexible manner, which will not be described herein.

A square module is the smallest information unit in a QR code, and QR codes of different versions include different numbers of modules. A QR code of version 1 includes 21×21 modules, and when its version number increases by 1, four modules are added in each of the horizontal and vertical directions in the QR code. The current highest version of QR code is Version 40, and its QR code comprises 177×177 modules. A correction pattern is composed of 5×5 black modules, 3×3 white modules, and 1 black module at the centre. In the selection of the square region, 64 modules, i.e., 8×8 modules are selected at first, which may completely enclose the entire correction pattern. Only if the correction pattern to be detected cannot be obtained in the square region with 64 modules due to an overall distortion or a large amount of offset of the QR code image, it is necessary to detect the correction pattern in an expanded area. The detection region may be expanded to 16×16 modules, i.e., a square region including 256 modules. If the correction pattern still cannot be found, the detection region may be further expanded to a square region including 1024 modules, i.e., 32×32 modules. At that point, in view of that the coordinates referred to in the rough locating is on the lower right portion of the QR code image, such a square region may go beyond the QR code image. If the correction pattern still cannot be found in such an expanded detection region, in theory, the detection region may be further expanded for detection. However, in most cases, the QR code image under detection may not be a real QR code image, i.e., there may be a mistake in the initial detection. Or the QR code image has got such a severe distortion that, even for a real QR code image, it is very difficult to decode the QR code image as limited by current techniques. To save computation steps, it is determined that when the correction pattern cannot be detected successfully, an error may be reported, and the detection step may exit. However, as appreciated by those skilled in the art, in this embodiment, an option may be still reserved to further expand the square region.

Figure 10:
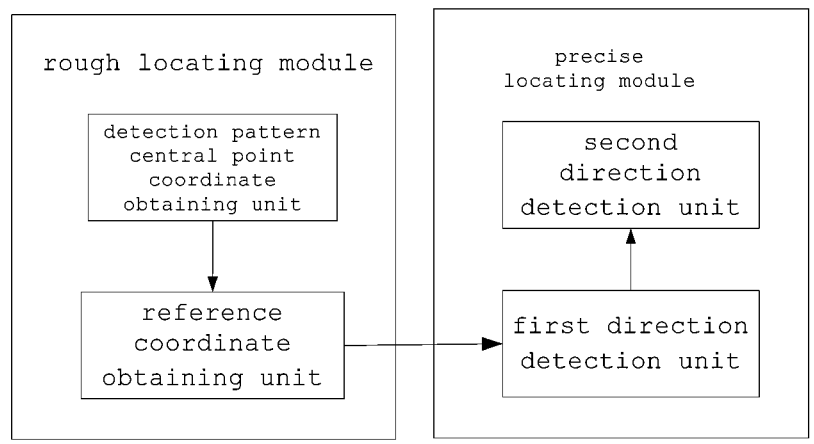
FIG. 10 is a structural diagram of a system for detecting a correction pattern in a QR code according to an embodiment of this invention.

Preferably, the precise locating module as shown in FIG. 10 particularly comprises:

a first direction detection unit, for detecting, in the predetermined area along the first direction, a first line segment having a length ratio of white:black:white meeting a predetermined ratio, and determining the central point of the black portion of the first line segment;

a second direction detection unit, for taking the central point of the black portion of the first line segment as a reference location to obtain a second detection line perpendicular to the first line segment, detecting along the second detection line a second line segment having a length ratio of white:black:white meeting the predetermined ratio, and taking the central point of the black portion of the second line segment as the central point of the correction pattern.

In this embodiment, when the system for detecting a correction pattern in a QR code detects a correction pattern, the correction pattern is at first roughly located to estimate coordinates of the correction pattern roughly according to different QR code versions, and then a square region is specified around the coordinates of the correction pattern, in which a search is performed repeatedly. Finally, in conjunction with the characteristic of the correction pattern itself, the correction pattern may be accurately located in the square region, without the need of searching patterns meeting a 1:1:1 ratio line by line in the entire QR code image, enabling a significantly reduced amount of computation, and faster and more effective correction pattern detection.

Figure 11:
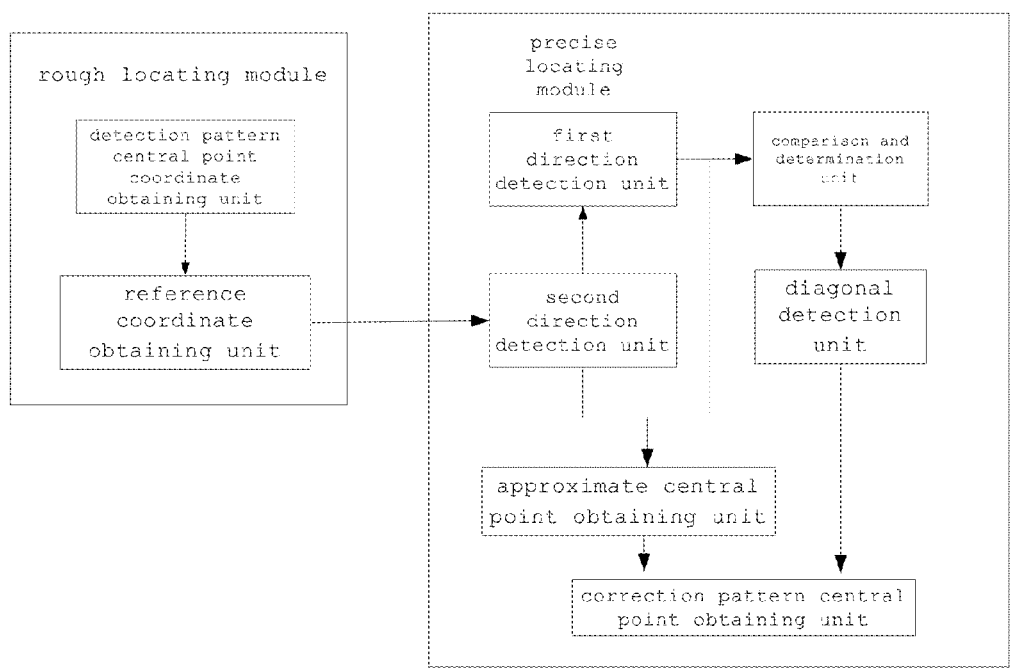
FIG. 11 is a structural diagram of a system for detecting a correction pattern in a QR code according to an embodiment of this invention.

As shown in FIG. 11, the precise locating module further comprises:

a comparison and determination unit, for taking the central point of the black section of the second line segment as a reference location, obtaining a third detection line perpendicular to the second line segment; detecting on the third detection line a third line segment having a length ratio of white:black:white meeting the predetermined ratio, wherein if the third line segment is detected, the central point of the black section of the second line segment is the central point of the correction pattern; otherwise, the process returns to the first direction detection unit.

a diagonal detection unit, for taking the central point of the black section of the second line segment as a reference location, obtaining a fourth detection line at +45 degree or −45 degree with respect to the first direction; detecting on the fourth detection line a fourth line segment having a length ratio of white:black:white meeting a predetermined ratio; wherein if the fourth line segment is detected, the central point of the black section of the second line segment is the central point of the correction pattern; otherwise, the process returns to the first direction detection unit.

After the operations of the first direction detecting unit and the second direction detecting unit, it is merely determined in theory that the central point of the second line segment is the central point of the correction pattern, without confirming whether the condition of a length ratio of white:black:white meeting the predetermined ratio is satisfied in the first direction, so detection errors may occur. In order to prevent such situations, as shown in FIG. 6, the precise locating module further comprises a comparison and determination unit, for taking the central point of the black section of the second line segment as a reference, obtaining a third detection line perpendicular to the second line segment; detecting on the third detection line a third line segment having a length ratio of white:black:white meeting the predetermined ratio, wherein if the third line segment is detected, the central point of the black section of the second line segment is the central point of the correction pattern; otherwise, the process returns to the first direction detection unit.

Because of the provision of the comparison and determination unit, a further determination is made on the second line segment where the central point of the second line segment locates to determine whether a third line segment where the central point locates may satisfy the condition of having a length ratio of white:black:white meeting the predetermined ratio.

Further, the precise locating module further comprises a diagonal detection unit, for taking the central point of the black section of the second line segment as a reference, obtaining a fourth detection line at +45 degree or −45 degree with respect to the first direction; detecting on the fourth detection line a fourth line segment having a length ratio of white:black:white meeting a predetermined ratio; wherein if the fourth line segment is detected, the central point of the black section of the second line segment is the central point of the correction pattern; otherwise, the process returns to the first direction detection unit.

a diagonal detection unit is further provided to detect on fourth detection lines passing through midpoint $C_{IZ}$ of the correction pattern at +45 degree and −45 degree to the first direction whether the condition of having a length ratio of white:black:white meeting the predetermined ratio may be satisfied; if the midpoint of second line segment is the centre of the correction pattern, the above condition is satisfied; otherwise, it is not the centre of the correction pattern, which may further ensure the accuracy of the detection. Thereby, the correction pattern in the QR code image may be detected rapidly, while ensuring detection accuracy to a certain extent and effectively lowering the rate of detection errors.

However, due to errors introduced in the shooting of the QR code image and its binarization process, the central black module of the correction pattern may become very large or merely a spot, and may be out of the central area. In this case, the correction pattern cannot be detected successfully with the above method. In order to realize effective correction pattern detection in such a case, the system of this embodiment has the following functions.

The first direction detection unit is further configured to determine edge lines of the correction pattern in the first direction according to two end points of the first line segment.

The second direction detection unit is further configured to determine edge lines of the correction pattern in the second direction according to two end points of the second line segment.

An unit for obtaining an approximate central point, which is configured to obtain a quadrangular border of the correction pattern according to the edge lines in the first direction and the edge lines in the second direction, wherein the geometrical centre of the quadrangular border is an approximate central point of the correction pattern.

A unit for obtaining central point of correction pattern, which is configured to obtain the midpoint of a line connecting the central point of the black section of the second line segment and the approximate central point as the central point of the correction pattern.

Through obtaining the central point of the black module and the approximate central point of the entire correction pattern respectively, and taking a midpoint thereof as the central point of the correction pattern, impacts caused by serious distortion of the central black module of the correction pattern may be handled appropriately to improve detection capability under various complex situations and ensure effective and accurate detection of the correction pattern in this embodiment.

A predetermined ratio is provided in this embodiment, which has some error compared with the 1:1:1 ratio. In this embodiment, the predetermined ratio is such configured that the sum of lengths of the white sections and the black section ranges from 0.7 L to 1.3 L, wherein L is the length of three modules, and the lengths of the white section and the black section are both less than or equal to the length of 2 modules. Due to the impacts of different imaging devices, the surrounding illumination, and environments, distortions and slight deformations may be generated on the correction pattern of the QR code image. In this case, detection errors may occur and the correction pattern cannot be detected successfully if the detection is performed according to whether the black to white ratio may strictly meet the 1:1:1 ratio. In order to cope with such a situation, a predetermined ratio is provided in this embodiment. That is, when a line segment with three alternative black-white patterns not strictly meeting the ratio of 1:1:1 is detected, the predetermined ratio is considered as being satisfied if the ratio falls within the predetermined ration range, and the central point of the correction pattern may be found accordingly. Note that, it is also necessary to ensure that the length of each white section and the length of each black section in the white:black:white pattern should not be larger than the length of 2 modules, and the total length of the white:black:white pattern is between 2.1 modules to 3.9 modules. If there is a white section, a black section or a white:black:white line segment exceeding the above limits, it is considered that the second predetermined ratio is not satisfied. The above setting of the predetermined ratio is derived from many numerical experiments, which may ensure favourable detection accuracy. Those skilled in the art may appreciate that other possible changes in data are all within the protection scope of this embodiment.

Embodiment 6

Modifications are made in this embodiment based on embodiment 4 or 5, mainly for detecting a correction pattern with a severe distortion in the central black module of the correction pattern. Taking a full consideration of various situations, in practice, the central black module of the correction pattern may disappear due to distortion or other reasons, only remaining the white module, as shown in FIG. 7. For this situation, a corresponding detection method is provided in this embodiment.

In this embodiment, the precise locating module further comprises:

a first direction fuzzy detection unit, for detecting, along the first direction in the predetermined area, a line segment having a white section in a predetermined length, and determining a first central point of the line segment;

a second direction fuzzy detection unit, for taking the first central point as a reference location, obtaining a detection line perpendicular to the first direction, detecting on the detection line a line segment having a white section in the predetermined length, and taking the midpoint of the line segment as the central point of the correction pattern.

In the absence of the central black module of the correction pattern, the correction pattern cannot be detected with the method of embodiment 2. Thus, a white module in a square region may be detected. If line segments therein have a length meeting a predetermined length, a correction pattern may be determined also and its central point may be taken as the central point of the correction pattern. Thus, correction pattern detection is not limited to effective detection for correction patterns with small distortions, and may produce a good detection effect on distorted QR code images as well, with improved capability of detecting correction patterns under various complex situations, to meet user's higher and higher requirements for QR code detection.

In order to ensure detection accuracy at the same time, a predetermined line segment length ranging from 0.7 L to 1.3 L is provided in this embodiment, which is derived from many numerical experiments, and may ensure favourable detection accuracy. However, one skilled in the art should appreciate that other applicable data changes is also within the scope of the embodiment, and will not further described.

A person skilled in the art should appreciate that the examples of the present application may be provided as method, system, or a computer program product. Therefore, the present application may take the form of completely hardware examples, completely software examples, or hardware and software combined examples. Moreover, the present application may adopt the form of a computer program product implemented on one or more computer readable storage medium (including but not limited to a disk storage, a CD-ROM, an optical disk, etc) containing computer usable program codes.

The present application is described with reference to the flowcharts and/or block diagrams of the method, apparatus (system) and computer program product of the examples of the present invention. It should be understood that a computer program instruction is used to implement each flow and/or block in the flowcharts and/or block diagrams, and combination of flows/blocks in the flowcharts and/or block diagrams. These computer program instructions may be provided to a universal computer, a special computer, an embedded processor or processors of other programmable data processing devices to generate a machine such that an apparatus for implementing the functions specified in one or more flow in the flowcharts and/or one or more blocks in the block diagrams is generated through the instructions executed by the computer or the processor of other programmable data processing devices.

These computer program instructions may also be stored in a computer readable memory that can direct the computer or other programmable data processing devices to work in a particular manner such that the instruction stored in the computer readable memory generates a product including an instruction apparatus, which implements the functions specified in one or more flows in the flowchart and/or one or more blocks in the block diagram.

These computer program instructions may also be loaded in a computer or other programmable data processing devices such that a series of operation steps are executed on the computer or other programmable data processing devices to generate computer implemented processing, and thus the instruction executed on the computer or other programmable data processing devices provides the steps for implementing the functions specified in one or more flows in the flowchart and/or one or more blocks in the block diagram.

Figure 12:
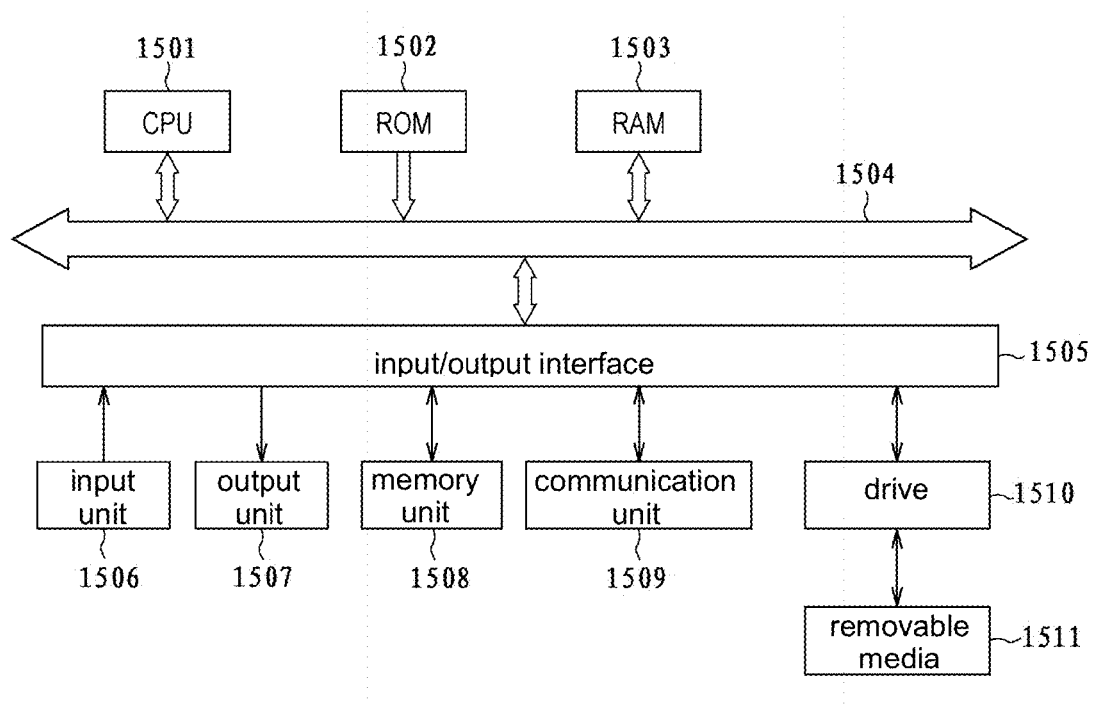
FIG. 12 shows a block diagram of an example of the structure of a computer.

FIG. 12 shows a block diagram of an exemplary computer hardware structure for carrying out the above processes.

A central processing unit (CPU) 1501, read-only memory (ROM) 1502 and random access memory (RAM) 1503 are connected with each other through a bus 1504.

An input/output (I/O) interface 1505 is connected to the bus 1504. Input units 1506 such as a keyboard or mouse and output units 1507 such as a display or a speaker are connected to the I/O interface 1505. In addition, a memory unit 1508 such as a hard disk or non-volatile memory, a communication unit 1509 such as a network interface and a driver 1510 for driving removable media 1511 are connected to the I/O interface 1505.

In the computer configuration described above, the CPU 1501 loads programs stored in the memory unit 1508 to RAM 1503 through the I/O interface 1505 and the bus 1504, and executes the programs to perform the above processes.

The programs executed by the CPU 1501 may be, for example, recorded on the removable media 1511 or may be provided through wired or wireless transmission media (e.g. a LAN, the Internet, or digital broadcasting), and installed in the memory unit 1508.

The programs executed by the computer may be executed according to the order described above, or may be processed whenever necessary (for example, by all).

Although the preferred examples of the present application have been described, a person skilled in the art, once obtaining the basic inventive concept, can make additional variations and modifications to these examples. Therefore, the attached claims are intended to be interpreted as including the preferred examples and all variations and modifications falling into the scope of the present application.

What is claimed is:

1. A method for detecting a correction pattern in a QR code, the method comprising:
   obtaining reference coordinates based on the relative location relationship between a central point of the correction pattern and central points of detection patterns;
   locating the correction pattern precisely in a predetermined area with respect to the reference coordinates to obtain coordinates of the central point of the correction pattern.

2. The method of claim 1 wherein obtaining reference coordinates based on the relative location relationship between the central point of the correction pattern and central points of detection patterns comprises:
   obtaining coordinates $(X_A, Y_A)$ of the central point of a first detection pattern;
   obtaining a horizontal reference coordinate according to the horizontal distance between the central point of the correction pattern and the central point of the first detection pattern; obtaining a vertical reference coordinate according to the vertical distance between the central point of the correction pattern and the central point of the first detection pattern.

3. The method of claim 2 wherein the horizontal distance and the vertical distance are determined according to the following equations:

the horizontal distance is $\epsilon_h = \epsilon(X_R - X_A)$ the vertical distance is $\epsilon_z = \epsilon(Y_R - Y_A)$ wherein, $X_R = X_B - X_A + X_C$, $Y_R = Y_B - Y_A + Y_C$, $(X_B, Y_B)$ is the coordinates of the central point of a second detection pattern; $(X_C, Y_C)$ is the coordinates of the central point of a third detection pattern; $\epsilon$ is an offset factor of the correction pattern.

4. The method of claim 3 wherein the offset factor of the correction pattern is determined according to the following equation:

$\epsilon = (N-3)/N$ wherein, N is the number of modules contained in the QR code in the horizontal or vertical direction.

5. The method of claim 1 wherein in the step of locating the correction pattern in a predetermined area with respect to the reference coordinates to obtain coordinates of the central point of the correction pattern, the predetermined area is a square region including the reference coordinates, and the square region includes at least 64 modules.

6. The method of claim 5 wherein the square region includes 256 modules.

7. The method of claim 5 wherein the square region includes 1024 modules.

8. The method of claim 1 wherein locating the correction pattern in a predetermined area with respect to the reference coordinates to obtain coordinates of the central point of the correction pattern comprises:
   detecting, in the predetermined area along the first direction, a first line segment having a length ratio of white:black:white meeting a predetermined ratio, and determining the central point of the black portion of the first line segment;
   taking the central point of the black portion of the first line segment as a reference location to obtain a second detection line perpendicular to the first line segment, detecting along the second detection line a second line segment having a length ratio of white:black:white meeting the predetermined ratio, and taking the central point of the black portion of the second line segment as the central point of the correction pattern.

9. The method of claim 8 wherein the step of locating the correction pattern in a predetermined area with respect to the reference coordinates to obtain coordinates of the central point of the correction pattern further comprises:
   taking the central point of the black section of the second line segment as a reference location, obtaining a third detection line perpendicular to the second line segment; detecting on the third detection line a third line segment having a length ratio of white:black:white meeting the predetermined ratio, wherein if the third line segment is detected, the central point of the black section of the second line segment is the central point of the correction pattern; otherwise, the process returns to the step of detecting in the predetermined area along the first direction.

10. The method of claim 8 wherein locating the correction pattern in a predetermined area with respect to the reference coordinates to obtain coordinates of the central point of the correction pattern further comprises:
    taking the central point of the black section of the second line segment as a reference location, obtaining a fourth detection line at +45 degree or −45 degree with respect to the first direction; detecting on the fourth detection line a fourth line segment having a length ratio of white:black:white meeting a predetermined ratio; wherein if the fourth line segment is detected, the central point of the black section of the second line segment is the central point of the correction pattern; otherwise, the process returns to the step of detecting in the predetermined area along the first direction.

11. The method of claim 8 wherein locating the correction pattern in a predetermined area with respect to the reference coordinates to obtain coordinates of the central point of the correction pattern further comprises:
    determining edge lines of the correction pattern in the first direction according to two end points of the first line segment;
    determining edge lines of the correction pattern in the second direction according to two end points of the second line segment;
    obtaining a quadrangular border of the correction pattern according to the edge lines in the first direction and the edge lines in the second direction, wherein the geometrical center of the quadrangular border is an approximate central point of the correction pattern;
    obtaining the midpoint of a line connecting the central point of the black section of the second line segment and the approximate central point as the central point of the correction pattern.

12. The method of claim 8 wherein the predetermined ratio is such configured that:
the sum of lengths of the white sections and the black section ranges from 0.7 L to 1.3 L, wherein L is the length of three modules, and the lengths of the white section and the black section are both less than or equal to the length of 2 modules.

13. The method of claim 8 wherein locating the correction pattern in a predetermined area with respect to the reference coordinates to obtain coordinates of the central point of the correction pattern:
if no horizontal or vertical line segment having a length ratio of white:black:white meeting the predetermined ratio is detected in the first direction after the detection in the predetermined area, the following step is performed:
detecting, along the first direction in the predetermined area, a line segment having a white section in a predetermined length, and determining a first central point of the line segment;
taking the first central point as a reference location, obtaining a detection line perpendicular to the first direction, detecting on the detection line a line segment having a white section in the predetermined length, and taking the midpoint of the line segment as the central point of the correction pattern.

14. The method of claim 13 wherein the predetermined length ranges from 0.7 L to 1.3 L.

15. A system for detecting a correction pattern in a QR code, the system comprising:
a rough locating module, for obtaining reference coordinates based on the relative location relationship between a central point of the correction pattern and central points of detection patterns;
a precise locating module, for locating the correction pattern precisely in a predetermined area with respect to the reference coordinates to obtain coordinates of the central point of the correction pattern.

16. The system of claim 15 wherein the rough locating module comprises:
a unit for obtaining coordinates of central points of detection patterns, which is configured to obtain coordinates $(X_A, Y_A)$ of the central point of a first detection pattern;
a unit for obtaining reference coordinates, which is configured to obtain a horizontal reference coordinate according to the horizontal distance between the central point of the correction pattern and the central point of the first detection pattern; obtaining a vertical reference coordinate according to the vertical distance between the central point of the correction pattern and the central point of the first detection pattern.

17. The system of claim 16 wherein the unit for obtaining reference coordinates determines the horizontal distance and the vertical distance according to the following equations:

$$\text{horizontal distance } \epsilon_h = \epsilon(X_R - X_A)$$

$$\text{vertical distance } \epsilon_z = \epsilon(Y_R - Y_A)$$

wherein, $X_R = X_B - X_A + X_C$, $Y_R = Y_B - Y_A + Y_C$, $(X_B, Y_B)$ is the coordinates of the central point of a second detection pattern; $(X_C, Y_C)$ is the coordinates of the central point of a third detection pattern; $\epsilon$ is an offset factor of the correction pattern.

18. The system of claim 17 wherein the offset factor of the correction pattern is $\epsilon = (N-3)/N$, wherein N is the number of modules contained in the QR code in the horizontal or vertical direction.

19. The system of claim 15 wherein in the precise locating module, the predetermined area is a square region including the reference coordinates, and the square region includes at least 64 modules.

20. The system of claim 19 wherein in the precise locating module, the square region includes 256 modules.

21. The system of claim 19 wherein in the precise locating module, the square region includes 1024 modules.

22. The system of claim 15 wherein the precise locating module further comprises:
a first direction detection unit, for detecting, in the predetermined area along the first direction, a first line segment having a length ratio of white:black:white meeting a predetermined ratio, and determining the central point of the black portion of the first line segment;
a second direction detection unit, for taking the central point of the black portion of the first line segment as a reference location to obtain a second detection line perpendicular to the first line segment, detecting along the second detection line a second line segment having a length ratio of white:black:white meeting the predetermined ratio, and taking the central point of the black portion of the second line segment as the central point of the correction pattern.

23. The system of claim 22 wherein the precise locating module further comprises:
a comparison and determination unit, for taking the central point of the black section of the second line segment as a reference location, obtaining a third detection line perpendicular to the second line segment; detecting on the third detection line a third line segment having a length ratio of white:black:white meeting the predetermined ratio, wherein if the third line segment is detected, the central point of the black section of the second line segment is the central point of the correction pattern; otherwise, the process returns to the first direction detection unit.

24. The system of claim 22 wherein the precise locating module further comprises:
a diagonal detection unit, for taking the central point of the black section of the second line segment as a reference location, obtaining a fourth detection line at +45 degree or −45 degree with respect to the first direction; detecting on the fourth detection line a fourth line segment having a length ratio of white:black:white meeting a predetermined ratio; wherein if the fourth line segment is detected, the central point of the black section of the second line segment is the central point of the correction pattern; otherwise, the process returns to the first direction detection unit.

25. The system of claim 22 wherein:
the first direction detection unit is further configured to determine edge lines of the correction pattern in the first direction according to two end points of the first line segment;
the second direction detection unit is further configured to determine edge lines of the correction pattern in the second direction according to two end points of the second line segment;
an unit for obtaining an approximate central point, which is configured to obtain a quadrangular border of the correction pattern according to the edge lines in the first direction and the edge lines in the second direction, wherein the geometrical center of the quadrangular border is an approximate central point of the correction pattern;

a unit for obtaining central point of correction pattern, which is configured to obtain the midpoint of a line connecting the central point of the black section of the second line segment and the approximate central point as the central point of the correction pattern.

26. The system of claim 22 wherein the predetermined ratio is such configured that:

the sum of lengths of the white sections and the black section ranges from 0.7 L to 1.3 L, wherein L is the length of three modules, and the lengths of the white section and the black section are both less than or equal to the length of 2 modules.

27. The system of claim 22 wherein the precise locating module further comprises:

a first direction fuzzy detection unit, for detecting, along the first direction in the predetermined area, a line segment having a white section in a predetermined length, and determining a first central point of the line segment;

a second direction fuzzy detection unit, for taking the first central point as a reference location, obtaining a detection line perpendicular to the first direction, detecting on the detection line a line segment having a white section in the predetermined length, and taking the midpoint of the line segment as the central point of the correction pattern.

28. The system of claim 27 wherein the predetermined length ranges from 0.7 L to 1.3 L.

29. A system for detecting a correction pattern in a QR code, the system comprising a processor, wherein the processor is configured to obtain reference coordinates based on the relative location relationship between a central point of the correction pattern and central points of detection patterns;

locate the correction pattern precisely in a predetermined area with respect to the reference coordinates to obtain coordinates of the central point of the correction pattern.

* * * * *